Patented Apr. 28, 1925.

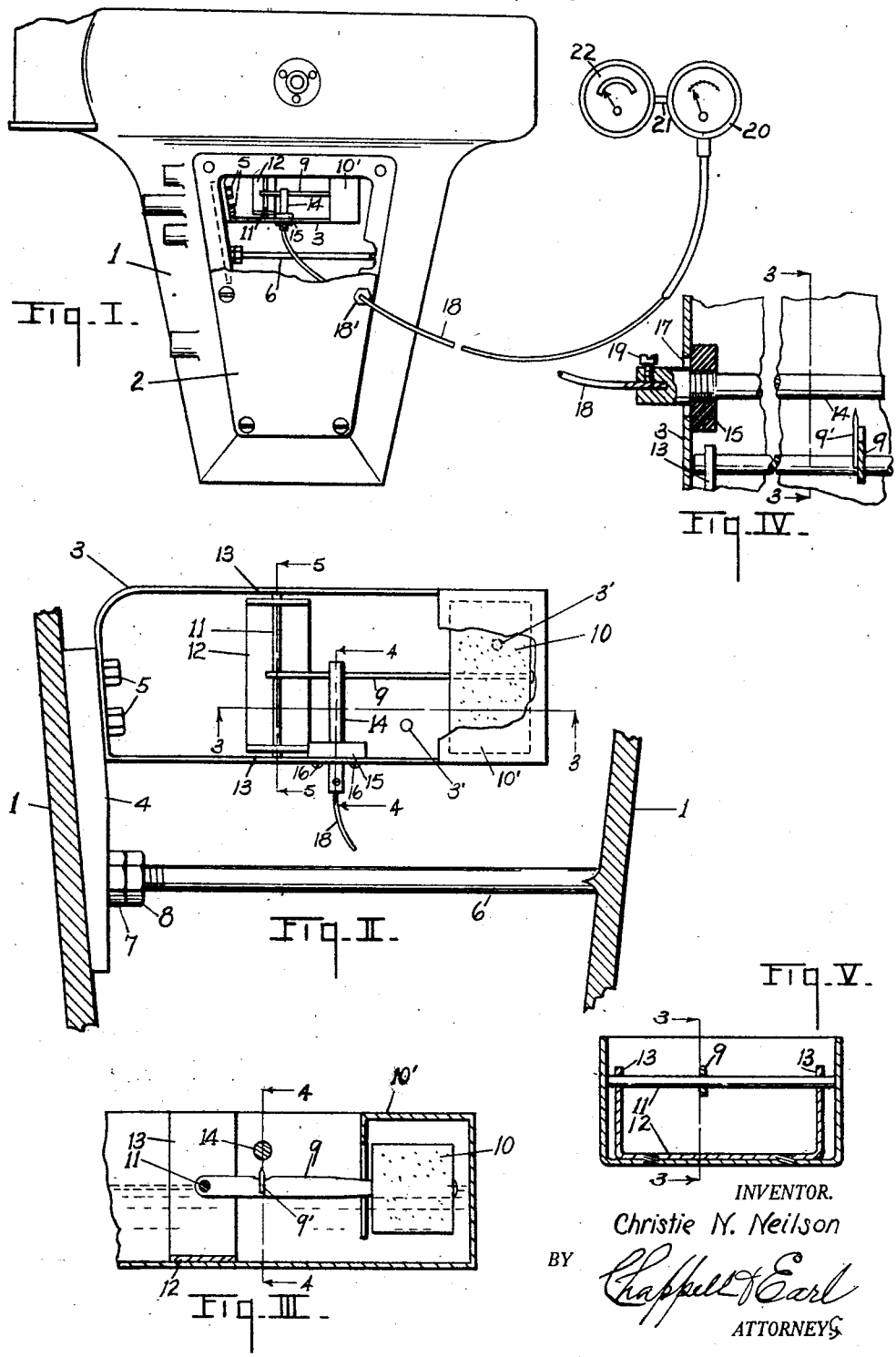

1,535,434

UNITED STATES PATENT OFFICE.

CHRISTIE N. NEILSON, OF JACKSON, MICHIGAN.

LUBRICATOR INDICATOR.

Application filed December 16, 1921. Serial No. 522,823.

*To all whom it may concern:*

Be it known that I, CHRISTIE N. NEILSON, a citizen of the United States, residing at Jackson, county of Jackson, State of Michigan, have invented certain new and useful Improvements in Lubricator Indicators, of which the following is a specification.

This invention relates to improvements in lubricator indicators.

The main object of the invention is to provide a simple and efficient electric lubricator indicator for automobiles.

Further objects, and objects pertaining to details and economies of construction and operation will definitely appear from the detailed description to follow.

I accomplish the objects of the invention by the devices and means described in the following specification. The invention is clearly defined and pointed out in the claims.

A structure which is a preferred embodiment of my invention is clearly illustrated in the accompanying drawing forming a part of this specification, in which:

Fig. I is a plan view of a transmission case of an automobile with a portion of the transmission cover door broken away to show details, the electric connection and indicator being shown diagrammatically.

Fig. II is an enlarged detail plan view of the main portions of my improved indicator within the transmission gear casing of an automobile, portions of the gear casing being shown in section.

Fig. III is an enlarged detail sectional elevation taken on the line 3—3 of Figs. II, IV and V showing details of the float means and the electric contact devices.

Fig. IV is an enlarged detail sectional elevation taken on a line 4—4 of Figs. II and III showing details of the electric contact terminals and the insulation therefor.

Fig. V is an enlarged detail sectional view taken on a line 5—5 of Figs. II and III showing details of the float rocker shaft means and the support therefor.

In the drawing the sectional views are taken looking in the direction of the little arrows at the ends of the section lines and similar numerals of reference refer to similar parts throughout the several views.

Considering the numbered parts of the drawing, 1 is the transmission casing of an automobile. 2 is the transmission casing cover door. 3 is the inner open top reservoir of my improved indicator means, the same being provided with small drain holes 3' in the bottom. This reservoir is secured to a supporting arm 4 by screws 5, 5, or otherwise, see Fig. II, and the supporting arm 4 is clamped to the inside of the transmission case to hold the reservoir in a position somewhat elevated above the oil level, by the clamping bolt 6 extending between the opposite walls thereof. This bolt is provided with the clamping nut 7 which is locked in place by the lock nut 8.

A float arm 9 carries a float 10 adapted to float in the oil contained in the reservoir. This float is housed by the partial casing 10' slotted to accommodate the arm. The arm 9 is carried by the rocker-shaft 11 which is supported in the U-shaped plate 12 having the upturned ends 13 within the side walls retained by spot welding or otherwise within the reservoir.

A sharp contact point 9' is on the upper side of the float arm 9. The opposite contact member 14 projects above the same so that the sharp point can penetrate its under surface when the oil fills into the reservoir to a sufficient level. This contact member 14 is carried on the insulator block 15 which is secured to the inner side wall of the reservoir 3 by screws 16, see Fig. II. The contact member 14 extends through the enlarged aperture 17 and is consequently insulated by the insulating support 15. A conductor 18 is secured to the contact member by the set screw 19 and extends out through a hole bored in one of the cover door cap screws 18' to a galvanometer or any suitable electric indicator 20 on the dash.

Current is supplied through a conductor 21 from the ammeter 22 which is usually disposed on the dash of the automobile. The electric current can, of course, be supplied from any source where it is generated about the automobile, but it is found that it can be conveniently connected by a very short connection to the circuit from the ammeter.

The operation of my improved indicator will be very clear from an examination of the details. The oil within the transmission case, when there is a sufficient supply, is agitated and splashed to thoroughly lubricate all adjacent parts. This splashing, when there is a sufficient quantity of oil present, tends to keep the reservoir 3 full and so long as there is sufficient lubricant to carry the float 10, electric contact occurs and the same is shown on the indicator. The contact point 9' carried by the float arm 9 is forced into the terminal 14, closing the circuit and passing current through the indicator at 20, showing that the oil is supplied. However, if the supply of oil runs low then the comparatively small amount of oil splashed into the reservoir will leak out through the drain holes 3', permitting the float to drop and separate the contact point 9' carried by the float arm 9 from the terminal 14. When the car stops, of course, there is no oil splashed and the indicator is not operated. As soon, however, as the engine is started oil will be thrown into the reservoir, and as soon as it raises the float 10 the circuit will be closed and the indicator will show that the oil supply is all right.

I have described my improved structure in its most approved form but will say that it can be greatly modified in its details without departing from the principle of my invention. I believe the specific embodiment possesses particular merit and I desire to claim it and its parts specifically. I also desire to claim the invention broadly as pointed out in the appended claims.

Having thus described my invention what I claim as new and desire to secure by Letters Patent is:

1. In a lubricator indicator for internal combustion motors utilizing the splash oiling system, the combination with the case containing the oil, of an open top reservoir positioned within the same and above the normal oil level, and having a drain opening in its bottom, a float within said reservoir, and an indicator actuated thereby for indicating the position thereof.

2. In a lubrication indicator for machinery utilizing a splash oiling system, the combination with the casing confining the oil, of an open top reservoir positioned within the same and above the normal oil level and having a drain opening in its bottom, a float within said reservoir, an indicator outside of said casing, and means extending through said casing and controlled by said float for operating said indicator.

3. In a lubrication indicator for machinery utilizing a splash oiling system, the combination with the casing confining the oil, of an open top reservoir positioned within the same and above the normal oil level and having a drain opening in its bottom, a float within said reservoir, an electric indicator outside of said casing, contact means within said casing, one of which is provided with a penetrating contact point for penetrating oil film in the coacting part, and an electric conductor extending through said casing and controlled by said float and contact means for operating said indicator.

4. In a lubricator indicator, the combination with the gear casing of an open top reservoir with discharge drain with a projecting arm disposed within the said gear case, and a clamping bolt means extending between the walls of the said gear case and clamping the said arm and supporting the said reservoir.

In witness whereof, I have hereunto set my hand and seal.

CHRISTIE N. NEILSON. [L. S.]